United States Patent
Groh et al.

(10) Patent No.: US 6,435,902 B1
(45) Date of Patent: Aug. 20, 2002

(54) SENSOR MOUNT

(75) Inventors: William S. Groh; James C. Robinson, both of Knoxville, TN (US); David M. Lally, Williamsville; Michael Traphagen, Cheektowaga, both of NY (US)

(73) Assignees: CSI Technology, Inc., Wilmington, DE (US); PCB Piezotronics, Inc., Depew, NY (US)

( * ) Notice: Subject to any disclaimer, the term of this patent is extended or adjusted under 35 U.S.C. 154(b) by 0 days.

(21) Appl. No.: 09/613,850

(22) Filed: Jul. 11, 2000

(51) Int. Cl.⁷ .......................... H01R 13/60; H01R 13/66
(52) U.S. Cl. ...................................... 439/527; 73/866.5
(58) Field of Search ........................ 439/527; 73/866.5, 73/661; 374/208

(56) References Cited

U.S. PATENT DOCUMENTS

| | | |
|---|---|---|
| 4,388,502 A | 6/1983 | Cohn |
| 4,823,602 A | 4/1989 | Christensen, Jr. |
| 4,825,710 A * | 5/1989 | Koneval et al. ........... 73/866.6 |
| 5,509,310 A | 4/1996 | El-Ibiary |
| 5,553,373 A * | 9/1996 | Sprayberry .................. 29/758 |
| 5,691,707 A | 11/1997 | Smith et al. |
| 5,854,994 A | 12/1998 | Canada et al. |
| 5,918,292 A | 6/1999 | Smith |
| 6,202,491 B1 * | 3/2001 | McCarty et al. .............. 73/659 |

* cited by examiner

Primary Examiner—Tulsidas Patel
Assistant Examiner—Brian S. Webb
(74) Attorney, Agent, or Firm—Luedeka, Neely & Graham, P.C.

(57) ABSTRACT

A sensor mount provides for attachment of a vibration sensor or other sensor to a machine without having to turn or rotate the sensor. In conjunction with a sensor module having an integral sensor and a shoulder formed at the outer periphery of the sensor module, the invention provides a coupler having a lower threaded portion for being threadingly engaged with a corresponding threaded recess formed in the machine. An externally threaded upper portion of the coupler remains exposed above the machine structure. A fastener is configured to attach the sensor module to the coupler by engaging the sensor module shoulder and the exposed upper portion of the coupler. The fastener may be captured to the sensor module or separable therefrom. When attached to a machine, the fastener and coupler are substantially symmetrically positioned with respect to a central axis of the sensor.

22 Claims, 3 Drawing Sheets

SENSOR MOUNT

FIELD OF THE INVENTION

This invention relates generally to attachment mechanisms. More particularly, this invention relates to an apparatus for mounting a sensor onto a machine.

BACKGROUND

In the practice of preventive maintenance of machines such as pumps and motors, it is important to monitor the dynamic and static conditions of the machine. When a machine exhibits anomalous vibrational characteristics, for example, it may be necessary to inspect the machine for repair or maintenance. Many preventative maintenance programs utilize accelerometers to sense vibrational characteristics of the machines. An accelerometer produces an electrical signal which corresponds to the level of vibration produced by the machine acting upon the accelerometer. The accelerometer may be held in contact with a machine test point by a maintenance technician while sensor data is read and stored by a portable data collector/analyzer. Other applications utilize permanent or semipermanent attachment of the accelerometer to the machine by means of mounting hardware. In such applications, the accelerometer output is routed to a computer, thereby providing continuous vibration data to the monitoring system.

One type of accelerometer mount is disclosed in U.S. Pat. No. 4,823,602 to Christensen, Jr., titled, "Accelerometer Mounting Device". Christensen describes a device for mounting an accelerometer which utilizes multiple component parts, including an external housing component, to mount an accelerometer to a machine. As is typical in the art, this mounting device includes a plethora of mechanical components, increasing the overall cost of the device by requiring a relatively complex manufacturing process for its many components. The device described in the Christensen, Jr. patent also requires a rather complicated procedure of attaching the accelerometer and mounting device to a machine. Furthermore, the mounting hardware described by Christensen, Jr. requires rotation of the sensor for attachment and removal, which further requires that at least one end of the sensor output cable be disconnected to prevent cable twist.

What is needed, therefore, is a simple and effective, low-cost mounting device for mounting a sensor to a machine.

SUMMARY OF THE INVENTION

The present invention overcomes the difficulties and disadvantages of the prior art by providing an apparatus for holding a sensor module in sensory contact with a machine to be monitored. The sensor module includes an integral sensor having a central axis, a shoulder, and a substantially planar lower surface. A coupler is provided which includes a lower portion for being attached to a structural element of the machine. With the lower portion of the coupler attached to the machine, an upper portion remains exposed above the machine structure. The exposed upper portion of the coupler includes a substantially planar upper surface which is brought into contact with the substantially planar lower surface of the sensor module with contact between the two planar surfaces maintained by a fastener. In a preferred embodiment, the fastener is a hex nut having an annular lip at one end for engaging the shoulder of the sensor module and having internal threading at the other end for engaging the exposed upper portion of the coupler. When attached to a machine, the fastener and coupler are substantially symmetrically positioned with respect to a central axis of the sensor.

BRIEF DESCRIPTION OF THE DRAWINGS

One or more preferred embodiments of the invention will now be described in further detail. Other features, aspects, and advantages of the present invention will become better understood with regard to the following detailed description, appended claims, and accompanying drawings (which are not to scale) where:

DETAILED DESCRIPTION

Figure 1:
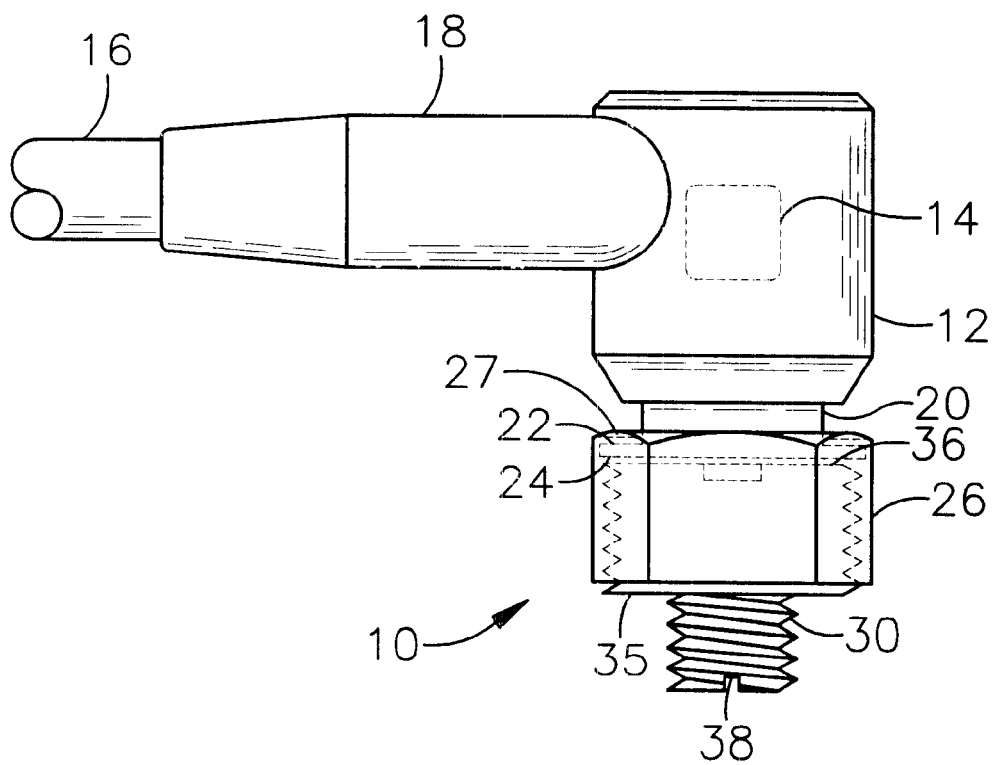
FIG. 1 is a side view of a sensor mount in accordance with a preferred embodiment of the invention, showing the fastener and coupler engaged for mounting a low profile sensor module with integral side exit sensor output cable to a machine.
Figure 2:
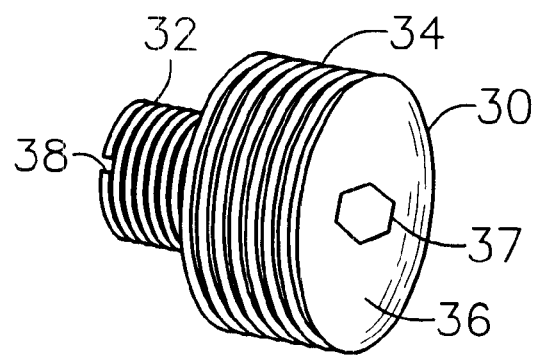
FIG. 2 is a perspective view of the coupler of FIG. 1.
Figure 3:
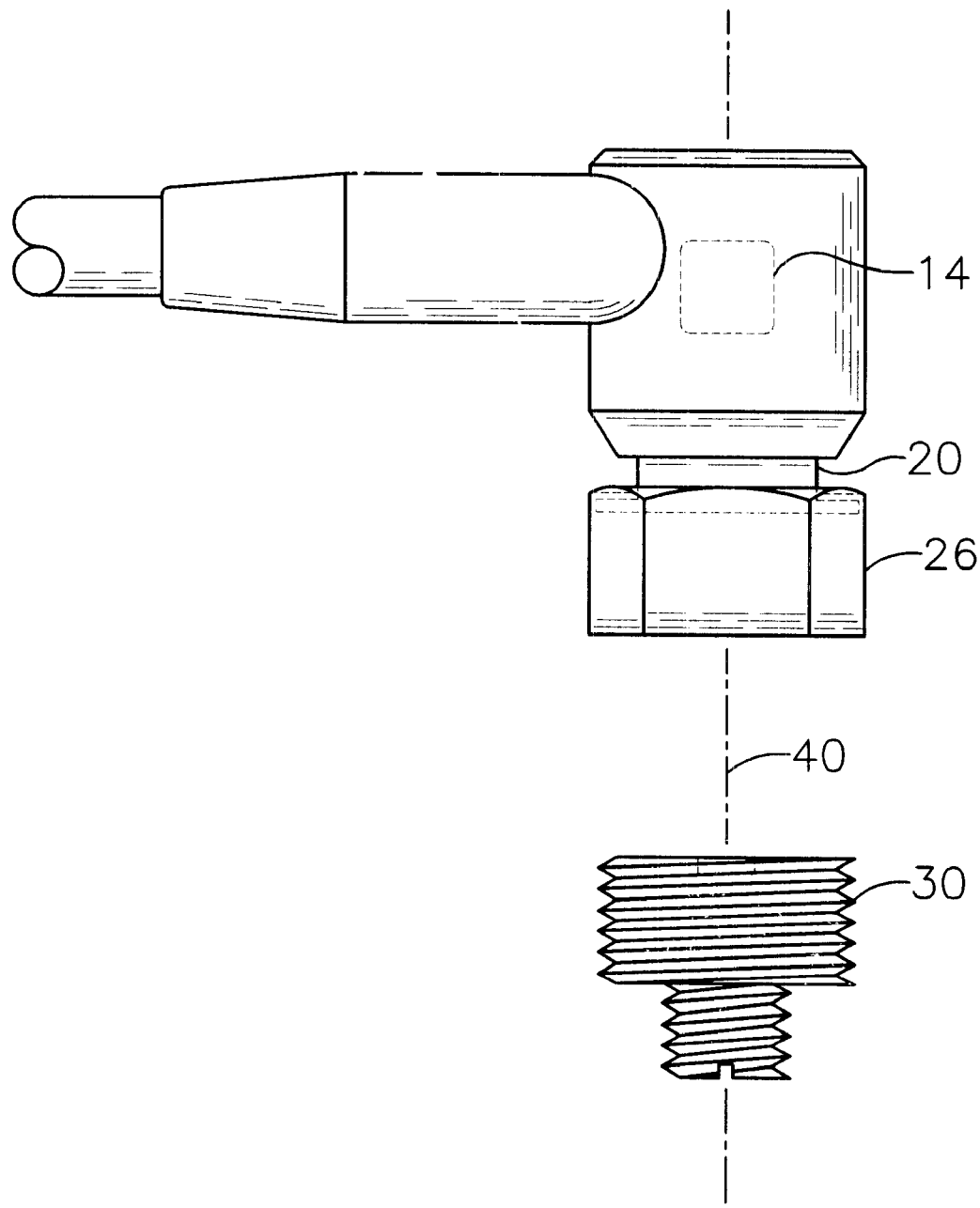
FIG. 3 is an exploded side view of the sensor mount and low profile sensor module of FIG. 1.

With reference now to the drawings in which like reference characters designate like or similar parts throughout the several views, FIGS. 1–3 illustrate a sensor mount 10 for mounting a sensor module 12 housing an integral sensor 14 onto a machine. FIGS. 1–3 illustrate use of the sensor mount invention for mounting a low profile sensor module 12 with side exit sensor output cable 16. Such low profile sensor modules are typically used when there is a limited amount of space between the desired measurement point of the machine and other structure. It will be understood, however, that the sensor mount invention may be employed to mount a variety of sensor module types to a machine, including sensor modules having sensor output cables which are detachable from the module.

The particular low profile sensor module 12 of FIGS. 1 and 3 includes an integral side exit sensor output cable 16 with a protector sleeve 18 to protect the cable 16 against chaffing and other potential damage at the high stress point where the cable 16 attaches to the sensor module 12. A vibration sensor 14 integral with the sensor module 12 senses mechanical vibrations produced by the machine and outputs a corresponding electrical signal on cable 16. The lower portion of the sensor module 12 includes a fastener interface 20 terminated by a flange having an annular upper surface forming a shoulder 22 and a substantially planar lower surface 24. As described below, the shoulder 22 is useful for securing the sensor module 12 to a machine using a preferred type of fastener.

The sensor module 12 is removably attached to a machine by the sensor mount 10. The sensor mount 10 includes a coupler 30 for being attached to the machine (preferably the machine's outer casing) and a fastener 26 for attaching the sensor module 12 to the coupler 30. In a preferred embodiment, fastener 26 is an internally threaded hex nut.

As shown in FIG. 2, the coupler 30 includes a lower threaded portion 32 projecting from an upper threaded portion 34. The coupler 30 is attached to a machine by rotating the coupler 30 to engage the lower threaded portion 32 with a corresponding threaded recess formed in the machine's outer casing. Preferably, the coupler 30 is rotated until the lower surface 35 (FIG. 1) of the upper threaded portion 34 is in firm contact with the machine casing. A recess 37 formed in the upper surface 36 of the upper threaded portion 34 is sized and configured to receive an Allen wrench, or other suitable tool, to assist in tightening the coupler 30 to the machine.

With the coupler 30 firmly attached to the machine, the sensor module 12 is attached to the coupler 30 by rotation of fastener 26, which is loosely positioned about the fastener interface 20, to engage the coupler's threaded upper portion 34 exposed above the machine casing. The fastener 26 includes an annular lip 27 which is sized to engage shoulder 22 and thereby bring the lower surface 24 of the fastener interface 20 into firm contact with the upper surface 36 of the coupler 30. To enhance installation, fastener 26 is configured to receive a wrench for tightening the sensor module 12 against the coupler 30. Thus, it will be appreciated that, unlike prior art sensor mount devices, the present invention enables a sensor module 12 and its sensor 14 to be attached to and removed from a machine without having to rotate the sensor module 12 or the sensor 14. Rotating the sensor during attachment requires that the cable be disconnected at one or both ends to avoid cable twist, which is a disadvantage that the present invention does not suffer.

In a preferred embodiment, the surface area of upper surface 36 is preferably substantially the same as the surface area of lower surface 24. This relatively large surface-to-surface contact area improves the overall accuracy of the sensor 12. Shoulder 22 also functions to capture fastener 26 to the fastener interface 20.

When the sensor module 12 and coupler 30 are removed from the machine, the coupler 30 may remain engaged with the fastener interface 20. A recess, preferably in the form of a notch 38, is provided in the lower threaded portion 32 of the coupler 30. The notch 38 is sized and configured to receive a tool, such as a flathead screwdriver, to assist in separating the coupler 30 from the sensor module 12.

The accuracy of sensor 14 is further enhanced by its symmetrical positioning with respect to the sensor mount 10. As shown in FIG. 3, coupler 30, fastener 26, fastener interface 20, and sensor 14 are substantially symmetrically positioned about a common axis 40. Aligning the sensor 14 and sensor mount hardware in this manner enhances sensor accuracy by eliminating anomalous measurements otherwise realized as a result of cantilever effects when the sensor 14 is not symmetrical with respect to its mounting hardware.

As previously described, the sensor mount 10 may be used to secure a variety of sensor types to a machine. For example, while the sensor module 12 shown in FIG. 1 includes an integral sensor output cable 16, the sensor mount 10 hardware may also be used to mount sensor modules with detachable cables.

Figure 4:
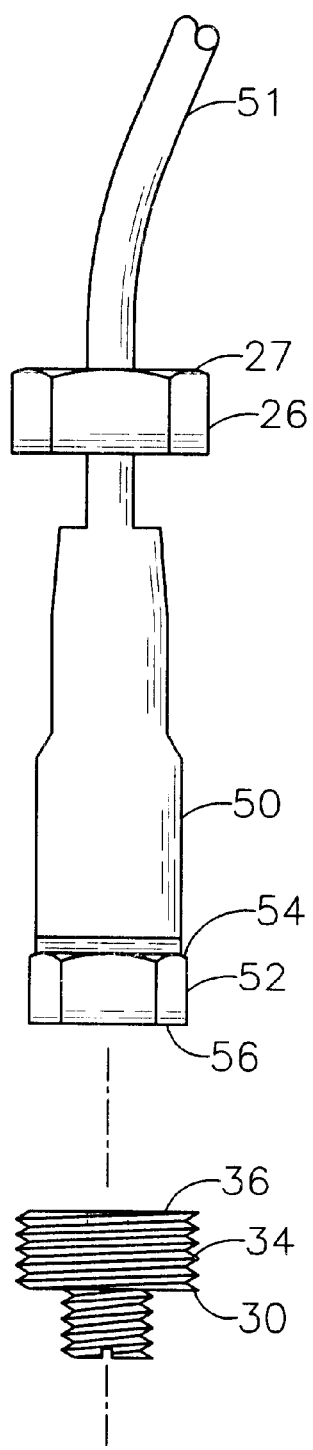
FIG. 4 is an exploded side view of a sensor mount in accordance with the invention, for mounting a sensor module with integral top exit sensor output cable to a machine.

To further illustrate the versatility of the sensor mount 10, FIG. 4 shows how coupler 30 and fastener 26 are used to secure an existing off-the-shelf, high profile sensor module 50 with integral top exit cable 51 to a machine. FIG. 4 depicts a model no. 608A11 accelerometer manufactured by PCB Piezotronics, Inc. of Depew, N.Y. The sensor module 50 includes an integral hex nut 52 at the base of the module 50 which is used for traditional attachment of the sensor 52 to a machine. Since the hex nut 52 is integral with the sensor module 50, its use requires rotation of the entire sensor module 50 and cable 51 during installation and removal.

With continued reference to FIG. 4, the upper surface of the hex nut 52 extends beyond the outer circumference of the sensor module 50 at six equally spaced locations to form a shoulder 54 which is engaged by the annular lip 27 of fastener 26. With the coupler 30 firmly attached to the machine as previously described, fastener 26 is engaged with the coupler's threaded upper portion 34 and then rotated and tightened so that the lower surface 56 of hex nut 52 is brought into firm contact with the coupler's upper surface 36. Thus, the sensor mount invention provides for attachment and removal of the sensor module 50 without the need for rotating the sensor module 50, while at the same time maintaining advantageous symmetry of the sensor module 50 and its mounting hardware.

While the invention has been described in detail, it is to be expressly understood that it will be apparent to persons skilled in the relevant art that various changes of form, design or arrangement may be made to the invention without departing from the spirit and scope of the invention. For example, while a preferred embodiment of the invention employs a threaded fastener to interconnect the sensor module with the coupler, the sensor module may instead be attached to the coupler by use of a clamp which, like the preferred threaded fastener, provides a means for placing the sensor module in sensory contact with a machine without having to turn or rotate the sensor. Accordingly, the above mentioned description is to be considered exemplary, rather than limiting, and the true scope of the invention is that defined in the following claims.

What is claimed is:

1. An apparatus for holding a sensor module in sensory contact with a machine, the apparatus comprising:

a sensor module including:
  a housing;
  a sensor disposed in said housing and having a central axis, said sensor being of a type to sense a characteristic of the machine and to produce a sensor output corresponding to the machine characteristic that is sensed;
  a substantially planar lower surface; and
  a cable attached to the housing and electrically coupled to the sensor for conducting the sensor output, at least a portion of said cable being external to the housing;

a coupler for being attached to a machine, said coupler including:
  a lower portion for being attached to a machine structural element; and
  an upper exposed portion connected to the lower portion and having a substantially planar upper surface; and a fastener for removably attaching the sensor module to the coupler without having to rotate the sensor with respect to the coupler during attachment.

2. The apparatus of claim 1, wherein the sensor module includes an accelerometer.

3. The apparatus of claim 1, wherein said coupler and said fastener are substantially symmetrically positioned with respect to the central axis of the sensor.

4. The apparatus of claim 1, wherein the upper portion of said coupler includes external threading and said fastener includes an internally threaded hex nut sized and configured for being threadingly engaged with the upper threaded portion of the coupler.

5. The apparatus of claim 4, wherein the lower portion of said coupler includes a recess for accepting a tool to facilitate separation of the coupler and fastener.

6. The apparatus of claim 1, wherein the lower portion of said coupler includes external threading for being threadingly engaged with a threaded recess formed in the machine.

7. The apparatus of claim 1, wherein the upper surface of the coupler includes a recess for accepting a tool to facilitate installation and removal of the coupler.

8. The apparatus of claim 1, wherein said sensor module further includes a shoulder and said fastener includes a lip for engaging the sensor module shoulder to establish and maintain contact between the sensor module lower surface and the coupler upper surface.

9. The apparatus of claim 1, wherein said fastener further includes multiple continuous threads requiring multiple turns of the fastener during attachment of the sensor module to the coupler.

10. An apparatus for attaching a vibration sensor to a machine, the apparatus comprising:
- a sensor module having:
  - a housing;
  - an integral sensor disposed in said housing and having a central axis, said sensor being of a type to sense a characteristic of the machine and to produce a sensor output corresponding to the machine characteristic that is sensed;
  - a cable attached to the housing and electrically coupled to the sensor for conducting the sensor output, at least a portion of said cable being external to the housing;
  - a shoulder adjacent the sensor module outer periphery; and
  - a substantially planar lower surface;
- a coupler for being removably attached to the outer surface of a machine, said coupler including:
  - a lower portion for being attached adjacent the machine's outer surface; and
  - an upper exposed portion connected to the lower portion and having a substantially planar upper surface; and
- a fastener for removably attaching the sensor module to the coupler without having to rotate the vibration sensor with respect to the coupler during attachment, said fastener including a lip for engaging the sensor module shoulder to establish and maintain contact between the sensor module lower surface and the coupler upper surface.

11. The apparatus of claim 10, wherein said coupler and said fastener are substantially symmetrically positioned with respect to the central axis of the sensor.

12. The apparatus of claim 10, wherein the upper portion of said coupler includes external threading and said fastener includes an internally threaded hex nut sized and configured for being threadingly engaged with the upper threaded portion of the coupler.

13. The apparatus of claim 12, wherein the lower portion of said coupler includes a recess for accepting a tool to facilitate separation of the coupler and fastener.

14. The apparatus of claim 10, wherein the lower portion of said coupler includes external threading for being threadingly engaged with a threaded recess formed in the machine.

15. The apparatus of Claim 10, wherein the upper surface of the coupler includes a recess for accepting a tool to facilitate installation and removal of the coupler.

16. The apparatus of claim 10, wherein said fastener further includes multiple continuous threads requiring multiple turns of the fastener during attachment of the sensor module to the coupler.

17. An apparatus for attaching a vibration sensor to a machine, the apparatus comprising:
- a sensor module having:
  - a housing;
  - an integral vibration sensor disposed in said housing and having a central axis, said sensor being of a type to sense a characteristic of the machine and to produce a sensor output corresponding to the machine characteristic that is sensed;
  - a cable attached to the housing and electrically connected to the sensor for conducting the sensor output, at least a portion of said cable being external to the housing;
  - a shoulder adjacent the sensor module outer periphery; and
  - a substantially planar lower surface;
- a coupler for being removably attached to the outer surface of a machine, said coupler including:
  - an externally threaded lower portion for being threadingly attached to a threaded recess formed in the machine's outer surface; and
  - a threaded upper portion connected to the lower portion and having a substantially planar upper surface; and
- an internally threaded fastener for removably attaching the sensor module to the upper portion of the coupler without having to rotate the vibration sensor with respect to the coupler during attachment, said fastener including a lip for engaging the sensor module shoulder to establish and maintain contact between the sensor module lower surface and the coupler upper surface, said fastener and said coupler being substantially symmetrically positioned with respect to said vibration sensor when the apparatus is attached to the machine.

18. The apparatus of Claim 17, wherein the lower portion of said coupler includes a recess for accepting a tool to facilitate separation of the coupler and fastener.

19. The apparatus of claim 17, wherein the upper surface of the coupler includes a recess for accepting a tool to facilitate installation and removal of the coupler.

20. The apparatus of claim 17, wherein said fastener further includes multiple continuous threads requiring multiple turns of the fastener during attachment of the sensor module to the coupler.

21. An apparatus for placing a vibration sensor in sensory contact with a machine, the apparatus comprising:
- a sensor module having:
  - a vibration sensor for sensing vibrations produced by the machine and producing vibration signals corresponding to vibrations sensed by the sensor;
  - means for nonremovably housing said vibration sensor such that said vibration sensor is nonremovably contained within said means for nonremovably housing; and
  - a cable attached to said means for nonremovably housing and electrically coupled to the vibration sensor for conducting the vibration signals to a signal processing device external to said means for nonremovably housing;
- a coupler for being attached to a machine, said coupler including:
  - a lower portion for being attached to a machine structural element; and
  - an upper exposed portion connected to the lower portion and having a substantially planar upper surface; and
- a fastener for removably attaching the sensor module to the coupler without having to rotate the sensor with respect to the coupler during attachment.

22. The apparatus of claim 21, wherein said fastener further includes multiple continuous threads requiring multiple turns of the fastener during attachment of the sensor module to the coupler.

* * * * *